United States Patent
Johnke et al.

(10) Patent No.: US 7,402,615 B2
(45) Date of Patent: Jul. 22, 2008

(54) WATERLESS WATERWASHABLE OFFSET PRINTING INK AND METHOD OF PRODUCTION THEREOF

(75) Inventors: Christian Johnke, Frankfurt am Main (DE); Bernard Fritz, Bruchkobel (DE)

(73) Assignee: Sun Chemical Corporation, Parsippany, NJ (US)

( * ) Notice: Subject to any disclaimer, the term of this patent is extended or adjusted under 35 U.S.C. 154(b) by 557 days.

(21) Appl. No.: 10/498,192

(22) PCT Filed: Dec. 13, 2002

(86) PCT No.: PCT/US02/39822

§ 371 (c)(1), (2), (4) Date: Feb. 9, 2005

(87) PCT Pub. No.: WO03/052010

PCT Pub. Date: Jun. 26, 2003

(65) Prior Publication Data

US 2005/0171236 A1    Aug. 4, 2005

(30) Foreign Application Priority Data

Dec. 13, 2001    (DE)   ............................... 101 61 309

(51) Int. Cl.
*C09D 11/00*    (2006.01)
(52) U.S. Cl. ..................................... 523/160; 523/161
(58) Field of Classification Search ................. 523/160, 523/161
See application file for complete search history.

(56) References Cited

U.S. PATENT DOCUMENTS

| | | | | |
|---|---|---|---|---|
| 4,304,601 A | * | 12/1981 | Sharp | ........................... 524/261 |
| 5,178,672 A | * | 1/1993 | Miller | ...................... 106/31.66 |
| 5,382,282 A | * | 1/1995 | Pennaz | ..................... 106/31.74 |
| 5,549,741 A | | 8/1996 | Pennaz et al. | |
| 6,140,392 A | * | 10/2000 | Kingman et al. | ............. 523/160 |

FOREIGN PATENT DOCUMENTS

WO    WO 96/34923    11/1996

* cited by examiner

*Primary Examiner*—Edward J Cain
(74) *Attorney, Agent, or Firm*—Dickstein Shapiro LLP

(57) ABSTRACT

A water washable waterless offset printing ink comprised of a binding agent having (i) a solid resin in an ester solvent, and (ii) an alkyd resin and/or an oil of one or more aliphatic carboxylic acid esters; a colorant; and a neutralizing agent.

14 Claims, No Drawings

WATERLESS WATERWASHABLE OFFSET PRINTING INK AND METHOD OF PRODUCTION THEREOF

FIELD OF THE INVENTION

The invention relates to a water washable printing ink on oil base for use in a water-free offset lithographic printing process and a washing agent with which the printing ink can be cleaned from a printing machine.

BACKGROUND OF THE INVENTION

In order to reduce unwanted volatile organic compounds such as solvents in the printing machine room, printing inks on a water base corresponding to printing inks on an organic base, i.e., an oil base, are increasingly preferred. Water free inks without organic bases are even more preferred. A water free printing ink which can be washed off without the help of organic solvents which emit volitile compounds is needed in the industry.

There are known waterbased printing inks for printing processes, especially for flexographic printing processes and intaglio printing processes, in which the areas of the printing plate which are supposed to take up the printing ink are characterized by depressions of the printing plate (relief process). The lithographic printing process has always presented unique challenges to ink formulators, since such process utilizes a planographic printing plate, wherein the image and non-image areas are in the same plane on the image carrier, and two fluids are concurrently utilized to insure that ink adheres only to the image area, and not to the non-image area. In conventional lithographic printing processes, the plate is damped before it is inked with an oil based ink. Typically, the damping process utilizes a water or aqueous fountain solution, such as those described in U.S. Pat. Nos. 3,877,372; 4,278,467; and 4,854,969. Upon damping, water forms a film on the hydrophilic areas (the non-image areas) of the printing plate, but contracts into tiny droplets on the oleophilic areas (the image areas) of the plate. When an inked roller containing the oil based ink is passed over the damped plate, it is unable to ink the areas covered by the water film (the non-image areas), but will emulsify the droplets on the water repellant areas (the image areas), causing such area to ink up. In the process of "offset lithography," the inked image on the plate does not directly print onto the paper substrate, but is first "offset" onto a rubber blanket, then transferred therefrom onto the paper substrate. Establishing and maintaining a correct ink/water balance during the printing process is critical, and requires a high level of skill. This is one of several disadvantages associated with such printing processes, as compared to flexographic and gravure printing processes. Moreover, the oil based inks and aqueous fountain solutions typically employed in conventional offset lithographic printing processes contain fairly high levels of undesirable VOCs, generally from 30 to 45%(is it that high). Further, the cleaning solutions used for press wash up may also contain VOCs.

Efforts have been undertaken to develop waterless lithographic printing processes. In these, the nonimage areas of the printing plate are coated with a polymer that repels the printing ink. The image areas are coated, for example, with a photosensitive polymer. Such printing processes are known, for example, from U.S. Pat. No. 5,370,906 and U.S. Pat. No. 5,417,749. The drawback to the known waterless printing processes is that the difference in surface energy between image area and nonimage area is drastically reduced, namely, from around 40 mN/m to 20 mN/m, thus resulting in decreased resolution of the ink. In order to preserve a large difference in surface energy between image area and nonimage area, which is important for good resolution, only the use of oil-based printing inks thus remains and thus the necessity of organic cleaning solvents remains.

From WO 96/34923 there is known a printing ink whose binding agent is formulated on an oil base and which can be washed off with an aqueous-alkaline medium. The drawback to this formulation is that it is not entirely water-washable and it contains free carboxyl groups.

Other approaches have suggested the use of a humidity chamber (U.S. Pat. No. 5,725,646) or special rewetting agents to prevent the evaporation of water from the printing rollers (U.S. Pat. No. 6,444,021). The rewetting agents affect the printability of the ink, as they do not dry effectively without heat and are therefore more costly to print with. In addition these compositions require high concentrations of humectant or rewetting agent to achieve the desired tack stability for the ink. Further, in U.S. Pat. No. 6,444,022 the water based lithographic ink uses certain linseed oil modified resins and humectants which extinguished the need for the humidity chamber associated with waterbased inks described in U.S. Pat. No. 5,725,646, but the inks retained gloss and drying problems. Further, these inks contain water which also affects printing qualities.

Today, organic detergents and/or solvents are primarily used for cleaning machine parts and mechanisms that have taken on ink during the printing. The drawback to the organic detergents is that they often liberate toxicologically unsafe volatile organic compounds.

Accordingly there is a need for a waterless water washable composition that uses no humectants and does not give off organic volatile compounds during its use while still maintaining suitable tack and viscosity for use in lithographic printing.

SUMMARY OF THE INVENTION

It has now been found that the above objectives can be realized by employing a lithographic printing ink comprised of (a) a binding agent, which is the reaction product of a solid resin in ester solvent with an alkyd resin and/or an oil of one or more aliphatic carboxylic acid esters, (b) a colorant, and (c) a neutralizing agent.

Furthermore, the subject of the invention is a washing agent for the water-washable printing ink, which comprises water with additives such as complexing agents, neutralizing agents, fragrances and/or wetting agents.

Finally, the subject of the invention is the production of the printing ink and the washing agent.

DETAILED DESCRIPTION OF THE INVENTION

According to the present invention it has been found that a combination of a binding agent which is the reaction product of a solid resin in ester solvent with an alkyd resin and/or an oil of one or more aliphatic carboxylic acid esters, a colorant, and a neutralizing agent provides a printing ink having no VOC content. The printing ink is waterless and water washable while still maintaining suitable tack and viscosity for lithographic printing as compared with conventional inks containing VOC solvents and/or water.

Binding Agent

The binding agent is comprised of a solid resin in solvent with an alkyd resin and/or oil. Suitable solid resins include those soluble in esters based on vegetable, animal or synthetic fatty acids. Examples of these include, but are not limited to, colophony ester resins, maleinate resins, fumarate resins, hydrocarbon resins, terpenic resins and modifications (derivatives) thereof. The solid resin may have an acid number (SZ) in the range of 10 to 200 mg KOH/g, preferably 30 to 150 mg KOH/g and especially preferably one with 50 to 90 mg KOH/g.

The alkyd resin may be a linseed alkyd resin and/or modifications thereof. The oil of one or more aliphatic carboxylic acid esters may be a drying oil, preferably an oxidatively drying oil. Other suitable oils include, but are not limited to, semidrying oils and/or alkyd resins. Further suitable oils having one or more aliphatic carboxylic acid esters include, but are not limited to, fatty acids with at least 8 carbon atoms, linseed oil, wood oil, soybean oil, rapeseed oil, fish oil, whale oil, as well as synthetic and semisynthetic oils. The choice of the oil depends, among other factors, on the type of printing ink being produced, and therefore nondrying oils can be used which are suitable for newspaper printing ink, whereas soybean oil is more suitable for heatset-roller offset printing ink. Suitable oils are described, for example, in "Printing inks for lithography" by Owen D. J., SITA Technology, 1994, pages 45 to 58.

The alkyd resin and/or the oil may have an acid number of up to 150 mg KOH/g, and more preferably in the range of 15 to 75 mg KOH/g.

The solvent and/or rheology adjusting agent may be esters based on vegetable, animal and/or synthetic fatty acids, with esterification components such as polyvalent alcohols, butanol, isopropanol, ethylhexanol, glycol, etc. Suitable solvents include, but are not limited to, the ester of coconut fatty acid, also preferred is ethylhexylester. Other suitable solvents include alcohols such as slow-evaporating propylene glycol, diethylene glycol, polypropylene glycol, glycol ether and/or hexylene glycol as these alcohols do not liberate volatile organic compounds.

Colorant

The colorant may be selected from traditional pigments and carbon blacks. Suitable colorants include, but are not limited to, yellow pigment, blue pigment, red pigment and carbon black for the four-color set. The colorant as pigment may be added to the lithographic printing ink composition either as a dry powder, flush, presscake, or as a water based dispersion.

Neutralizing Agent

The neutralizing agent is a base, including, but not limited to, inorganic bases such as NaOH and KOH, and organic bases such as monoethanol amine, dimethylethanol amine, triethanol amine, diethanol amine and/or ammonia. Preferable neutralizing agents are amine functional bases and more preferred is aminomethylpropanol.

Additives

The printing ink of the present invention may also contain additives such as rheological adjuvants, thickening agents, abrasion protection, accelerators (especially for drying, especially preferable for oxidative drying), tack regulators, antiskinning agents and/or gelatinizing agents.

Suitable Theological adjuvants include but are not limited to an extender pigment such as chalk PW 18, talc, kaolin or the like. Suitable thickening agents may include conventional thickeners such as hectorite, amorphous silicic acids, associative thickener, gelatinizing agent and/or polyamidoamines. Preferably, a bentonite and/or an organic-aluminum compound is used. Suitable abrasion protection may be PE, PTFE, paraffin wax and other wax pastes and more preferably a micronized paraffin wax.

The accelerators may be drying agents based on cerium, zirconium, zinc, calcium, and a preferred accelerator is a drying agent based on Cobalt/manganese. A tack regulant may be added such as a siloxane and more preferably a polymethylsiloxane.

An anti-skinning agent may be added such as an antioxidant. Suitable antioxidants include phenol derivatives, hydroquinone, monotertiary butyl hydroquinone, toluene hydroquinone, and more preferably 2,2-methylene-bis-(4-methyl-6-tert-butylphenol).

The printing ink can also contain other alkyd resins and/or oils, which are non-reactive with the solid resins that make up the binding agent. Suitable non-reactive alkyd resins and/or oils are oxidatively drying resins, such as highly viscous alkyd resins with an acid number between 50 and 100 mg KOH/g or viscous alkyd resins with free hydroxyl groups (OH number greater than 80), and also modified linseed oil or maleated vegetable oils, preferably soybean oil besides linseed oil, with an acid number of around 35 to 50 mg KOH/g. These alkyd resins serve to provide pigment wetting, gloss, oxidative drying, and abrasion resistance of the printing ink and ultimately they also promote the water-washability of the printing ink.

Printing Ink

The printing ink of the present invention is formulated, for example, by first reacting the dissolved solid resin in the solvent with the alkyd resin at elevated temperature to form the binder/binding agent and mixing them with the powder-like components such as pigments, wax, and thickener. While not being bound by theory, a reaction of the still free carboxyl groups of the binding agent and/or of the alkyd resins occurs with the neutralizing agent. A salt is thereby formed, which enables the partial solution and/or washing away with water. The reaction with the neutralizing agent should be as quantitative as possible, so that a complete salt formation occurs. Additives such as an accelerator, tack regulator, and other solvents can then be added.

The binding agent, which is the reaction product of the mentioned solid resin in solvent with an alkyd resin and/or an oil and further addition of additives such as anti-skinning agents and gelatinizing thickening agents, comprises about 30 wt. % to about 60 wt. % of the printing ink. The binding agent itself is comprised of about 40 to 50 wt. % each of solid resin and/or solvent, about 4 to 8 wt. % of alkyd resin component and the remainder of gelatinizing or thickening agent, and antiskinning agent.

The colorant comprises up to about 25 wt. % of the printing ink, more preferably about 10 wt. % to about 15 wt. %.

The rheological adjuvant if contained in the formulation is in the range of up to 5 wt. % of the printing ink. The thickening agent if present in the formulation is up to 2 wt. % of the printing ink. The abrasion protection may comprise up to about 2 wt. % of the printing ink. The antiskinning agent may comprise about 0.1 and 1 wt. % of the printing ink. The accelerator may comprise up to about 2 wt. % of the printing ink. The neutralizing agent is contained in the range of 1 to 3 wt. %, preferably at around 2 wt. % of the printing ink. Non-reactive alkyd resins may comprise up to 20 wt. % of the printing ink, preferably about 5 wt. % to about 17 wt. %, and more preferably from about 10 wt. % to about 15 wt. %.

Prior to preparing the printing ink, the binding agent/varnish is prepared by placing the solvent (alkyd resin) and other additives such as non-reactive alkyd resins, vegetable oils, antioxidants, in a reactor or heatable stirred-tank. This mixture is heated to temperatures between 160-260° C., generally, 180° C. The solid resin is added and the temperature will reduce to under 160° C. The mixture is then heated to 180° C. and is kept at this temperature for 1 to 3 hours. For required gelling, the reactor is cooled to a temperature between 80 and 120° C. (depending on the gel agent), it is useful to add some of the ingredients, e.g. solvent alkyd or oil (10-15%) to accelerate the cooling. After cooling, the gelatinizing or thickening agent is added under rapid stirring. The mixture is then heated to 160 to 180° C. and kept there for 0.5 to 1 hour. The binding agent/varnish is then cooled down to between 80 and 120° C. Quality control is done at the same time to measure the viscosity (100-120 dPas) and the tack (190-210). If necessary, more solvent is added to meet viscosity and tack parameters so as to meet those of conventional inks.

In a batch container the varnish/binding agent is added with non-reactive alkyd resins, vegetable oils and solvent and mixed with the dissolver. The powderlike components are added, such as pigment, wax, thickener, etc. Further mixing occurs under the dissolver. The resulting mixture is dispersed in a suitable aggregate down to a grain size less than 10 µm using a three-roll mill, agitator ball mill or other suitable mill.

The carboxyl groups contained in the varnish/binding agent and the alkyd resins react with the alkalis, such as amine, resulting in a salt formation, which accomplishes the partial dissolving or washing with water. The amine must be carefully mixed in for at least 10 minutes in order to ensure that it has reacted as much as possible. The remaining components and additives are finally added.

Quality control is performed, during which the viscosity, flow limit, and tack are determined and corrected if necessary to meet the standards of conventional inks.

Washing Agent

A washing agent is used to wash the formulated ink off of the printing machinery after printing and is comprised of water and additives such as an emulsifying agent, lubricant, anti-foaming agent, neutralizing agent, emulsion stabilizer, corrosion protection and/or fragrances. Preferably, the water portion of the wash makes up 70 to 97 wt. % of the washing agent, more preferably 85 to 95 wt. % and most preferably about 90 wt. %. In general, a high water portion in the washing agent is always preferred over a lower one. more preferably ethylhexylsulfate. These adjuvants are used as aqueous solution with a water portion of around 60 wt. % and their portion lies in the range of 2 to 20 wt. %. Thus, the maximum net content of additives is around 8 wt. %.

The washing agent may also include a lubricant and dissolving adjuvant such as a high boiling alcohol, preferably one with a vapor pressure less than 0.1 mbar, such as glycol or glycol ether, also glycerine. Suitable lubricants and dissolving adjuvants include but are limited to propylene glycol, preferably polypropylene glycol. The lubricant and/or dissolving adjuvant is added in a quantity of 0 to 20 wt. %.

The washing agent may contain an antifoamer such as siloxane and/or a mineral oil. A preferred antifoamer is organosiloxane.

Some alkali, such as NaOH, KOH and/or other bases such as amines, may also be contained in the washing agent. Suitable alkali are a solution of 40% NaOH in water, which completes saponification of the carboxyl groups. The aqueous alkali is preferably contained in the washing agent in a quantity of 0.5 to 5 wt. %.

The washing agent may also comprise emulsion stabilizers, builders or dispersion adjuvants such as zeolite, sodium metasilicate, phosphate and/or nitrilo-acetic acid. Preferred emulsion stabilizers include the salt of a polycarboxylate, more preferably the sodium salt of a maleic-acrylic acid polycarboxylate. The emulsion stabilizer as a solution with around 75 wt. % water can make up 5 to 20 wt. % of the washing agent.

The washing agent may also comprise a corrosion protection and/or the sequestration such as a complexing agent, for example, a phosphonate, phosphate, EDTA and/or a gluconate. Preferred corrosion protection and/or sequestration include phosphonate, more preferably a sodium phosphonate. This component, as a solution with about 70 wt. % water, can make up 1 to 5 wt. % of the washing agent.

The washing agent may contain the above-mentioned additives according to the quantity of colorizing component in the printing ink and/or depending on the soiling of the parts being cleaned.

The water washable ink compositions of the present invention and washing agent are further illustrated by the following non-limiting examples in which all parts and percentages of components are by weight and based on the total weight of the composition, unless otherwise indicated.

EXAMPLE 1

Water washable lithographic inks were prepared from the components indicated below:

TABLE I

| Component | Ink A | Ink B | Ink C | Ink D | Range Target Wt. % |
|---|---|---|---|---|---|
| Alkyd Resin[a] | 10.5 | 11.3 | 11.3 | 12.7 | Up to 20 |
| Alkyd Resin[b] | 7.5 | 11.3 | 11.3 | 12.7 | Up to 20 |
| Oil[c] | 7 | 8.5 | 8.5 | 10 | Up to 20 |
| Antioxidant[d] | 0.3 | 0.3 | 0.4 | 0.2 | 0.1-1 |
| Rheological adjuvant[e] | 3.00 | | | | 0-5 |
| Thickening agent[f] | | | 1.00 | 1.00 | 0-2 |
| Colorant | 10.5[g] & 0.6[h] | 14.5[i] | 14.5[j] | 1.9[j] & 14.5[k] | 8-22 |
| Wax[l] | 2.00 | 1.5 | 1.00 | 1.00 | 0-2 |
| Neutralizing agent[m] | 1.5 | 2 | 2 | 2 | 1-3 |
| Varnish (See Table II below) | 50.1 | 43.6 | 44.60 | 39.45 | 30-60 |
| Accelerators[n] | 3.00 | 3.00 | 3.00 | 2.00 | 1-5 |
| Siloxane | 1.2 | 0.30 | 0.40 | 0.30 | 0-2 |
| Rheology adjusting agent | 2.8[o] | 3.7[o] | 2[o] | 0.25[o] & 2.00[p] | 0-5 |
| TOTAL | 100 | 100 | 100 | 100 | |

[a]Alkyd 23, manufactured by Sun Chemical of Carlstadt, USA; a linseed oil based alkyd resin.
[b]Hydrokyd 9, manufactured by Eastmann of Belgium; a linseed oil modified polyester.
[c]Resydrol Val 5227W, manufactured by Solutia Chemicals of Austria; an alcohol modified linseed oil.
[d]Lowinox 22 M 46, manufactured by Great Lakes; a phenolic antioxidant.
[e]ASP 170, manufactured by Engelhardt; a kaolin
[f]Bentone SD1, manufactured by Rheox; a bentonite
[g]Permanentgelb GRX 86, manufactured by Clariant of Frankfurt, Germany; a dry yellow pigment, C.I. 13)
[h]Ecocart Orange, manufactured by Sun Chemical of Frankfurt, Germany; an orange toning base dispersion.
[i]C.I. Pigment Red 57:1, manufactured by Sun Chemical of Wavre, Belgium; 2-Naphthalenecarboxylic acid, 3-hydroxy-4-[(4-methyl-2-sulfophenyl)azo]-, calcium salt (1:1).
[j]Fastogenblue H 5375 SD, manufactured by DIC of Düsseldorf, Germany; a dry blue pigment, C.I. 15:3.
[k]Elftex 415, manufactured by Cabot of Botlek, Belgium; a black pigment, C.I. 7
[l]Vestowax Spray 30, manufactured by Degussa of Mart, Germany; a wax.
[m]AMP 95, manufactured by Angus Chemie of Ibenbüren; an aminomethylpropanol.
[n]Manosec cd 26, manufactured by OMGKokkola of Finland; a combination manganese/cobalt carboxylates.
[o]Estisol 312, manufactured by Haltermann GmbH of Hamburg, Germany; a 2-ethylhexyl ester oil.
[p]Dowanol TPM, manufactured by Dow Chemical of Horgen, Switzerland; a tripropyleneglycolemethylether.

TABLE II

| Varnish Components | Wt. % |
|---|---|
| Solvent[q] | 48.90 |
| Mono-tertiary-butyl hydroquinone | 0.10 |
| Solid resin[u] | 44.50 |
| Alkyd resin[r] | 6.00 |
| Thickening agent[s] | 0.5 |
| TOTAL | 100.0 |

[q]Estisol 312, manufactured by Haltermann GmbH, Hamburg, Germany, a 2-ethylhexyl ester oil.
[u]Tegraf 940, manufactured by Cray Valley of Sant Celoni, Spain; a rosin modified phenolic resin.
[r]Beckosol L655I, manufactured by Reichhold of Vienna, Austria; a linseed oil modified polyester resin.
[s]Additol VXL 12, manufactured by Solutia of Wiesbaden, Germany; an aluminum organic gelling agent).

EXAMPLE 2

The ink compositions of Example 1 were printed on a substrate using a Quickmaster DI 46-4 press manufactured by Heidelberg GmbH, Heidelberg, Germany. The viscosity was measured using a rotational viscosimeter, manufactured by Physica of Stuttgart, Germany. The tack of the was measured using an Inkomat, manufactured by Prüfbau Dr. Dürner GmbH of Peissenberg, Germany. These results are set forth below:

TABLE IV

| Properties | Ink A | Ink B | Ink C | Ink D |
|---|---|---|---|---|
| Viscosity (Pas@ 100 s$^{-1}$) | 31.3 | 36.1 | 34.2 | 37.7 |
| Inkomat 300 l/min (cleavagecapability) | 8.3 | 10.1 | 10.4 | 10.2 |

The volatile organic compound ("VOC") content of the ink was essentially zero as defined by European clean air requirements which require that every ingredient of the ink must have a vapor pressure lower than 0.1 mbar (@20° C.). The inks of Example 1 had tack comparable or better than conventional inks and viscosity comparable or superior to conventional inks.

EXAMPLE 3

A washing agent for water washable inks was prepared from the components indicated below:

TABLE III

| Component | wt. % | Range |
|---|---|---|
| Wetting Agent[a] | 10 | 2-20 |
| Lubricant[b] | 5 | 0-20 |
| Antifoamer[c] | 0.05 | 0.01-0.1 |
| Caustic Soda | 2.45 | 0.5-5 |
| Emulsion Stabilizer[d] | 10 | 5-20 |
| Corrosion protection[e] | 2 | 1-5 |
| Water | 70.5 | 60-80 |
| TOTAL | 100 | |

[a]Serdet DSK 40, manufactured by Servo Delden of the Netherlands; an ethylhexylsulfate.
[b]Pluriol P 600, manufactured by Clariant of Frankfurt, Germany; a polypropylene glycol.
[c]Dee fo 35, manufactured by Lehmann & Voss of Hamburg, Germany; a silicone antifoamer.
[d]Sokolan CP 9, manufactured by BASF AG of Ludwigshafen, Germany; a sodium salt of a maleic/acrlycopolymer.
[e]Dequest 2060, manufactured by Solutia Chemicals of Belgium; a sodium phosphonate.

The washing agent of Example 3 was used on a Quickmaster DI 46-4 press. The observed water washability for the inks was excellent and equaled that of conventional press cleaners having solvents which release harmful VOCs into the atmosphere of the press room.

The invention claimed is:

1. A water washable waterless offset printing ink composition comprising: a) a binding agent which is the reaction product of (i) a solid resin in an ester solvent, with (ii) an alkyd resin or an oil of one or more aliphatic carboxylic acid esters or both, b) a colorant, and c) a neutralizing agent in an amount sufficient to neutralize the carboxyl groups of the binding agent.

2. The printing ink composition of claim 1, having about 30 to about 60 wt. % binding agent; up to about 25 wt. % colorant; and about 1 wt. % to about 3 wt. % neutralizing agent.

3. The printing ink composition of claim 1 wherein the solid resin is selected from the group consisting of colophony ester resins, maleinate resins, fumerate resins, hydrocarbon resins, terpenic resins and combinations thereof.

4. The printing ink composition of claim 3 wherein the solid resin is a rosin modified phenolic resin.

5. The printing ink composition of claim 1 wherein the ester solvent is selected from the group consisting of vegetable, animal and/or synthetic fatty acids or alcohol.

6. The printing ink composition of claim 5 wherein the ester solvent is the ester of coconut-fatty acid.

7. The printing ink composition of claim 5 wherein the ester solvent is ethyihexylester.

8. The printing ink composition of claim 5 wherein the ester solvent is an alcohol.

9. The printing ink composition of claim 8 wherein the alcohol is selected from the group consisting of propylene glycol, diethylene glycol, polypropylene glycol, glycol ether, hexylene glycol and combinations thereof.

10. The printing ink composition of claim 1 wherein the alkyd resin is a linseed alkyd resin.

11. The printing ink composition of claim 1 wherein the neutralizing agent is an amino-functional base.

12. The printing ink composition of claim 11 wherein the neutralizing agent is aminomethylpropanol.

13. A method for preparing a water washable waterless offset printing ink comprising: a) formulating a binding agent, having (i) a solid resin in an ester solvent, and (ii) an alkyd resin and/or an oil of one or more aliphatic carboxylic acid esters; b) adding a colorant; and c) adding a neutralizing agent prior to adding any rheological adjuvants and solvents for saponification of any free carboxyl groups of the binding agent.

14. The printing ink composition of claim 2, having about 10 to about 15 wt. % colorant.

* * * * *